Dec. 23, 1941.   S. A. FOSTER   2,267,559
GAUGE
Filed July 5, 1940

Stuabel. A. Foster.
INVENTOR.
BY Stanley Lightfoot
ATTORNEY

Patented Dec. 23, 1941

2,267,559

UNITED STATES PATENT OFFICE 2,267,559

GAUGE

Shubel A. Foster, Ferndale, Mich.

Application July 5, 1940, Serial No. 343,953

15 Claims. (Cl. 200—52)

This invention relates primarily to gauges of that type particularly adapted to be in continuous contact with the outer diameter of a work piece with either a continuous or interrupted surface of revolution during the reduction in diameter in the grinding operation.

Heretofore in all grinding operations it has been necessary for the machine operator to exercise extreme care and constant vigilance in order that the reduction in diameter is not carried beyond the desired limits as indicated by the gauging device. This device provides an automatically actuated safeguard that can be set for the desired diameter in such a manner that the grinding machine feed is interrupted at the precise size value and may be even so adapted to a control mechanism such that the grinding wheel automatically is backed away from the work at the completion of the grinding operation.

The primary object of my invention is to provide a position size responsive limit switch that may be applied and utilized in a manner eliminating all undersize grinding.

Another object is to provide a device which will operate in a manner assuring a precise finished diameter on the work piece without constant attention on the part of the operator.

A further object is to provide a form of limit gauge which will eliminate the severe eye and nerve strain resulting from close attention to precise grinding operations.

A further object is to provide means which will permit the safe application of automatic feed at a predetermined rate of relatively low value to a grinding wheel feed so that when the contour is reduced to the predetermined size, the limit switch will operate to stop, control or retract the grinding wheel, or initiate any desired function in the machine or apparatus to which it may be applied.

In carrying the said invention into effect, I may utilize the novel construction and arrangement of parts hereinafter described, by way of example, having reference to the accompanying drawing, wherein.

Similar characters of reference indicate similar parts in the several figures of the drawing.

Figure 2:
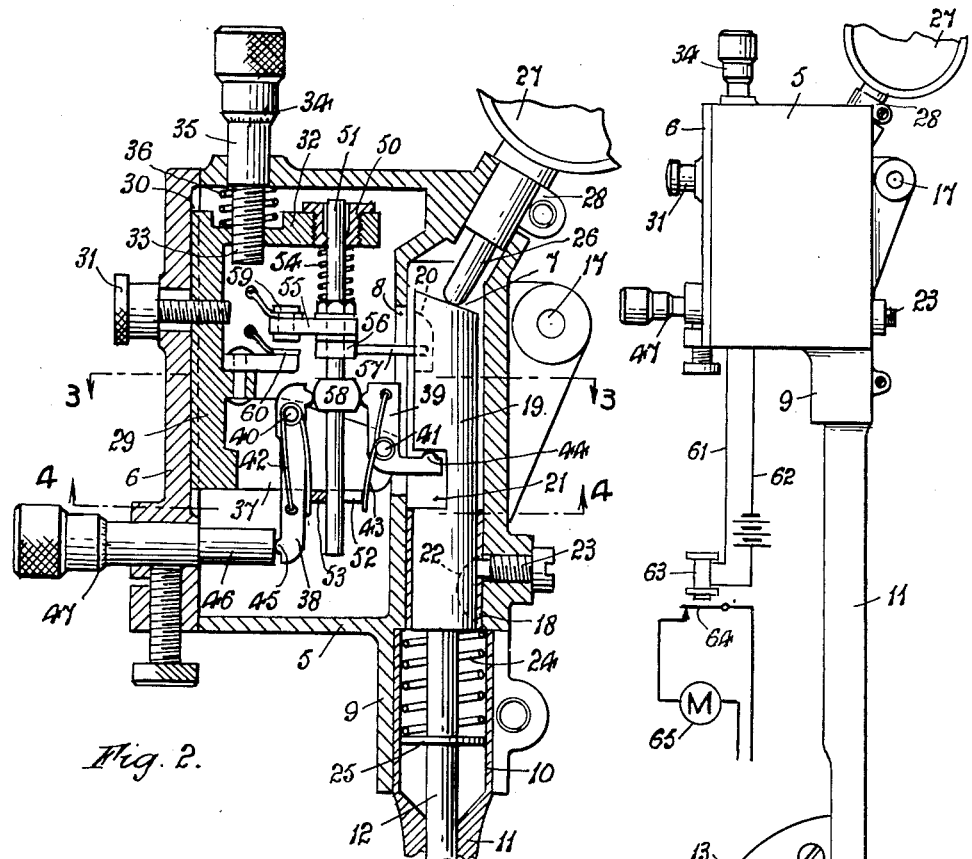
Figure 2 is a vertical section of the body or casing of the device showing the switch or indicator controlling mechanism.
Figure 3:
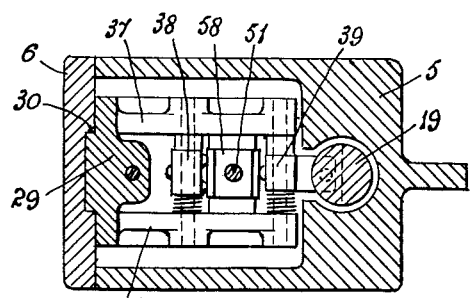
Figure 3 is a horizontal section of the same taken on a plane indicated by the line 3—3, in Figure 2.
Figure 4:
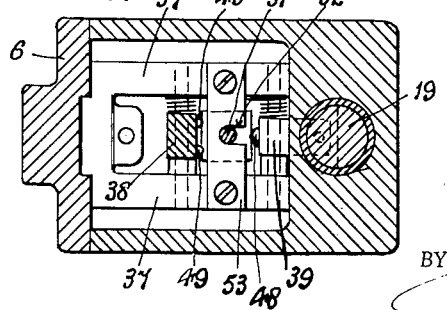
Figure 4 is a similar section taken on a plane indicated by the line 4—4, in Figure 2.

In general, in its illustrated form, the device comprises a box-like body 5 having a cover plate 6 closing the front end thereof, and having formed in its rear portion a vertical bore 7, the surrounding wall of which is ported at 8 for communication with the interior of the body.

Extending from the underside of the said body 5 and in axial alignment with the said bore 7 is a tubular clamp member 9 which engages the upper chambered end 10 of an elongated tubular guide member 11, which member accommodates a reciprocal gauge rod 12. To the lower part of this gauge rod guide 11 is attached a yoke 13 carrying at its lower extremity the stationary gauge member or anvil 14 and being also provided with a work-positioning stop 15, by means of which the work 16 may be properly located between the opposed ends of the gauge members 12 and 14 as will be readily understood.

17 is a boss provided on the body 5 to be engaged by any suitable supporting device on the machine or apparatus with which the gauge is to be used.

Housed within the bore 7 of the body and guided by a bushing 18 is a plunger 19 formed on or connected to the upper end of the said gauge rod 12, so that it is reciprocal therewith, this plunger having formed therein recesses 20, 21 and 22, the latter being merely to receive the inner end of the said screw 23 the purpose of which is merely to limit the longitudinal movement of the said plunger 19 and incidentally of the said gauge rod 12.

Within the chambered upper end of the tubular guide member 11 is a compression spring 24 bearing on an annular abutment 25 carried by the rod 12 and thereby urging the said gauge rod 12 downwardly against the work. The upper end of the said plunger 19 bears against the pin 26 of a dial indicator 27, the stem of which may be suitably held in the clamp member 28 formed in the upper end of the body. This indicator 27 enables positions of the gauge member to be visually determined at any time as will be readily understood.

Carried by and vertically slidable on the inner side of the said cover plate 6 is a C-shaped frame 29, the vertical portion of which is recessed at 30 into the cover plate for guidance and is provided with a thumb screw 31 for locking the frame in vertical positions of adjustment on the said cover plate. The upper arm 32 of the said adjustable frame has threaded thereinto the adjustment screw 33 of the micrometer 34, the barrel 35 of which micrometer is secured in any suitable manner in the top wall of the body 5. A compression spring 36, between the said top wall and the said upper arm of the frame, urges the said frame downwardly so that manipulation of the micrometer 34 in the usual manner will effect the calibrated movement vertically of the said frame when the thumb screw 31 is loosened for such purpose.

The lower arms 37 of the said adjustable frame are spaced to accommodate levers 38 and 39 carried by pivots 40 and 41 respectively mounted in the said lower arms of the frame, the upper ends of the said levers being urged toward one another by springs 42 and 43 and forming gap elements as will become apparent. The lever or gap element 39 is shown as being of a bell crank type, its lower arm extended more or less horizontally in the form of a trigger into the recess 21 of the said plunger 19 and being provided with a wear-resisting and friction-reducing projection 44 impinging on the upper wall of the said recess 21. The other lever or gap element 38 extends downwardly below the arms 37 and is provided with a similar projection 45 which engages the outer end of the adjustable spindle 46 of a micrometer 47 mounted horizontally in the lower part of the body.

From the foregoing, it will be seen that the raising or lowering of the frame 29, by manipulation of the micrometer 34, results in the raising or lowering of the pivots 40 and 41 of the levers or gap elements 38 and 39 relative to any given position of the upper contact wall of the recess 21 of the plunger 19, and that such movement will consequently vary the angular position of the bell crank lever 39. For example, if the plunger remains stationary and the frame 29 be lowered within the body 5, the upper arm of the bell crank lever 39 will swing in the direction of the upper end of the other lever 38, thereby reducing the gap therebetween. Movement of the frame upwardly would, of course, have the opposite effect and increase this gap.

The said gap may be also finely increased or reduced by operation of the micrometer 47 controlling the pivotal movement of the lever or gap element 38; and it is desired that very delicate adjustment of this lever 38 may be obtained, for which reason the pivot 40 is positioned very close to the upper end of the said lever whereby the proportional movement of the said upper end of the lever to that of the micrometer spindle 46 is fractional and capable of such delicate adjustment when controlled by a sensitive micrometer such as it is proposed to use at this point. The upper micrometer 34 is intended to be designed for coarser and quicker adjustment of the effective spacing of the gap elements.

The gap face of the upper arm of the lever 39 is provided with a wear and friction-reducing projection 48, while the opposed gap face of the lever 38 is provided with preferably two similar projections 49.

Carried by the upper arm 32 of the adjustable frame 29, and above the gap between the upper arms of the levers or gap elements 38 and 39, is a bushing 50 through which a reciprocal stem 51 extends, the said stem passing downwardly through the said gap and through a slot 52 is a plate 53 which extends transversely beneath the arms 37 of the said frame. The said stem is, to all practical purposes, vertically disposed midway between the gap faces of the said levers 38 and 39 when the lower part of the stem is seated in the bed of the said slot 52.

This stem 51 is urged downwardly by a compression spring 54 engaged between the said bushing 50 and a nut which secures an insulator 55 on the said stem. This insulator is also supported by a further nut 56 from which an arm 57 extends into the hereinbefore mentioned upper recess 20 of the plunger 19.

Also carried by the said stem 51 is a gauge block 58 having arcuate or similarly formed surfaces presented in the direction of the gap faces of the levers 38 and 39, whereby downward motion of the gauge block 58 and incidentally of the stem 51 would be prevented by the projections 48 and 49 on the gap faces of the said levers 38 and 39, unless the gap between the said projections be at least equal to the maximum width of the gauge block presented thereto.

59 and 60 are contacts which, in their illustrated relationship, may close only when the gauge block 58 passes below the projections 48 and 49 of the levers or gap elements 38 and 39, thus permitting the stem 51 and the contact 59 to descend; so that it will be seen that the primary adjustment of this gap between the said projections 48 and 49 of the gap elements will determine the extent to which the bell crank lever 39 must be eventually rocked by downward movement of the plunger 19 to increase the said gap sufficiently to let the gauge block so pass for the purpose of closing the said contacts.

It will also be apparent that, in use, this downward movement of the plunger 19 will accompany the reduction of the diameter of the work 16 so that the release of the said gauge block 58 by the gap elements will be effected when a predetermined diameter of the work is reached, this point being determined by the rough setting of the micrometer 34 and the fine setting of the micrometer 47.

In order to prevent the binding of the stem 51 and ensure ready movement of the gauge block 58 between the gap projections 48 and 49, when conditions so permit, the said stem 51 is capable of slight swinging movement in the bushing 50 and in the slot 52 of the plate 53, so that the said gauge block may pass over the extremities of the projections 49 of the lever 38, which lever remains stationary throughout the actual gauging operation of the mechanism, in the arrangement as illustrated, as only the lever 39 moves in response to movement of the plunger 19.

It will be quite clear that since passage of the gauge block 58 through the gap, upon the gauged diameter of the work being attained, will close the contacts 59 and 60 (although it might equally well be the opening of contacts where such an arrangement is thought necessary or desirable), this action may serve to operate any suitable mechanism designed to interrupt the grinding or machining operation, or produce any such effect on the grinding machine mechanism or apparatus which may be desired, the exact nature of which is not a part of this invention.

After the gauging of the work has been accomplished and determined by the passage of the said gauge block between the gap elements, the said gauge block may be re-set above the said elements by raising the plunger 19, such as through the agency of the gauge rod 12, or by any suitably provided means, until the lower wall of the recess 20 impinges on the arm 57, whereby a continued upward movement of the said plunger 19 will lift the stem 51 and parts carried thereby to an upper re-set position.

It will be seen that the gap members 38 and 39 together with the stem 51 and parts carried thereby, including the gauge block 58, comprise a switch mechanism which is actuated by the gauge rod 12 through the agency of the plunger 19, which switch is capable of being pre-set to operate when the gauge rod moves downwardly to a predetermined extent, and also capable of being re-set by the movement of the said plunger 19 in the opposite direction.

The said gauge controlled switch may serve to control a machine or parts of a machine or apparatus, either for starting or stopping, or to initiate any operation or stop any operation when the work has been reduced to a desired dimension, which dimension may be determined with very great accuracy due to the high sensitivity of control of the gap members over the passage of the gauge block 58. It will also be readily appreciated that the said switch may simply serve to control an indicator such as a light or buzzer to warn of the completion of the grinding or other operation.

Figure 1:
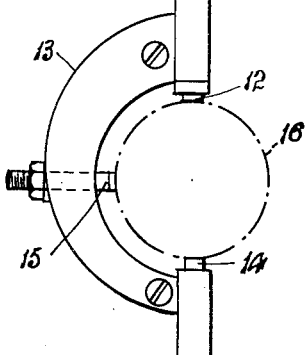
Figure 1 is an elevation of my improved limit gauge shown schematically as applied to the work and electrically coupled to a motor controlling the work.

In Figure 1, the wires 61 and 62 from the contacts 59 and 60 are indicated as connected to a relay 63 which in turn controls the switch 64 of the motor 65 which may be assumed to control the operation of the machine (not shown) grinding the work 16, the motor in this case being shut off by the operation of the described switch mechanism when the precise diameter of the work is attained.

Broadly, herein and in the claims, the switch and such elements as the switch may control, are referred to as "indicator means" as in general the result of the switch operation is to indicate to the operator that the grinding or other work is completed, even though it also results in some other mechanical result such as the stopping of the grinding operation.

Actually, the block 58 is what is commonly referred to in the mechanical arts as a "tell-tale" inasmuch as its operation indicates, either directly or indirectly according to its mode of observation, the accomplishment of a certain desired gauging function. In so far as this application is concerned, it is immaterial whether the operation of the tell-tale block results in the control of a machine, the flashing of a warning signal, or any other indication that the function sought has been accomplished.

What I claim is:

1. In a device of the class described, in combination, a work dimension-responsive gap element, a manually adjustable gap element, a tell-tale gauge block movable between said elements when said work dimension-responsive element moves to spread said gap elements to a determined extent, and a body structure supporting said elements and said gauge block in operative relation to one another.

2. In a device of the class described, in combination, variably spaced gap elements, setting means for adjustably determining the normal spacing of said gap elements, a gauge member coupled to one of said gap elements to increase the spacing therebetween at the predetermined point in the movement of said gauge member, a gauge block movable between said gap elements when the spacing thereof is so increased by said gauge member, means responsive to the movement of said gauge block to indicate its passage between said gap elements, and a body structure supporting said elements, said gauge block and said gauge member in operative relation to one another.

3. In a device of the class described, in combination, a size-responsive work-gauging member, a movable spring pressed tell-tale block, and means actuated by said work-gauging member normally interrupting the movement of said block, said means being movable out of the path of said block by the movement of said work-gauging member to a predetermined extent, and a body structure supporting said member, said block and said means in operative relation to one another.

4. In a device of the class described, in combination, a movable tell-tale gauge block, variable gap elements normally interrupting the movement of said block, a work-gauging member, one of said gap elements being pivotally mounted for rocking by said work-gauging member to permit the movement of said gauge block, means for adjusting the pivotal point of such element to variably determine the movement of said work-gauging member required to permit the movement of said gauge block, and a body structure supporting said block, said elements and said member in operative relation to one another.

5. In a device of the class described, in combination, a movable tell-tale gauge block, variable gap elements normally interrupting the movement of said block, a work-gauging member adapted to spread said elements to permit the movement of said gauge block, means for adjusting the initial spacing of said variable gap elements, and a body structure supporting said block, said elements and said member in operative relation to one another.

6. In a device of the class described, in combination, a movable tell-tale gauge block, variable gap elements normally interrupting the movement of said block, a work-gauging member adapted to spread said elements to permit the movement of said gauge block, means for adjusting the initial spacing of said gap elements, adjusting means variably determining the operating position of said work-gauging member relative to said elements, and a body structure supporting said block, said elements and said means in operative relation to one another.

7. In a device of the class described, in combination, a movable tell-tale gauge block, variable gap elements normally interrupting the movement of said block, a work-gauging member, one of said gap elements being pivotally mounted for rocking by said work-gauging member to permit the movement of said gauge block, means for adjusting the pivotal point of such element to variably determine the movement of said work-gauging member required to permit the movement of said gauge block, adjusting means for varying the initial spacing of said gap elements, and a body structure supporting said block, said elements and said means in operative relation to one another.

8. In a device of the class described, in combination, a movable tell-tale gauge block, variable gap elements normally interrupting the movement of said block, a work-gauging member, one of said gap elements being pivotally mounted for rocking by said work-gauging member to permit the movement of said gauge block, means for adjusting the pivotal point of such element to variably determine the movement of said work-gauging member required to permit the movement of said gauge block, means for moving the other gap element towards and from said pivotal element to vary the initial spacing of said gap elements, and a body structure supporting said block, said elements and said means in operative relation to one another.

9. In a circuit-controlling gauge device of the class described, a switch box having a switch mounted therein, a biassed gauge block movable in said box to operate said switch, variable gap elements carried by said box normally interrupting the movement of said block, a work-gauging member carried by said box and movable to spread said elements to permit the passage of gauge block therebetween, and manually operable means for returning said block to its original pre-set position.

10. In a circuit-controlling gauge device of the class described, a switch box having a switch mounted therein, a biassed movable gauge block operating said switch, variable gap elements mounted in said box and normally interrupting the movement of said block, a work-gauging member extending from said box and adapted to spread said elements to permit the movement of said gauge block therebetween, adjusting means carried by said box for variably determining the operating position of said work-gauging member relative to said elements, and manually operable means for returning said block to its original pre-set position.

11. In a circuit-controlling gauge device of the class described, a switch box having a switch mounted therein, a biased movable gauge block in said box operating said switch, variable gap elements carried by said box and normally interrupting the movement of said block, a work-gauging member extending from said box, one of the gap elements being pivotably mounted for rocking by said work-gauging member to permit the movement of said gauge block through the gap, means carried by said box for adjusting the pivotal point of such element to variably determine the movement of the work-gauging member required to permit the passage of said gauge block, and manually operable means for returning said block to its original pre-set position.

12. In a circuit-controlling gauge device of the class described, a switch box having a switch mounted therein, a biased movable gauge block in said box operating said switch, variable gap elements mounted in said box to normally interrupt the movement of said block, a work-gauging member extending from said box and adapted to spread said elements to permit the movement therebetween of said gauge block, means carried by said box for adjusting the initial spacing of said variable gap elements, and manually operable means for returning said block to its original pre-set position.

13. In a circuit-controlling gauge device of the class described, a switch box having a switch mounted therein, a biased movable gauge block in said box operating said switch, variable gap elements mounted in said box to normally interrupt the movement of said block, a work-gauging member extending from said box and adapted to spread said elements to permit the passage therebetween of said gauge block, means carried by said box for adjusting the initial spacing of said gap elements, further means carried by said box for variably determining the operating position of said work-gauging member relative to said elements, and manually operable means for returning said block to its original pre-set position.

14. In a circuit-controlling gauge device of the class described, a switch box having a switch mounted therein, a biased movable gauge block operating said switch, variable gap elements carried by said box to normally interrupt the movement of said block, a work-gauging member extending from said box, one of the said gap elements being pivotably mounted for rocking by said work-gauging member to permit the movement of said gauge block through the gap, means carried by said box for adjusting the pivotal point of such element to variably determine the movement of said work-gauging member required to permit the said movement of said gauge block, further adjusting means carried by said box for varying the initial spacing of said gap elements, and manually operable means for returning said block to its original pre-set position.

15. In a circuit-controlling gauge device of the class described, a switch box having a switch mounted therein, a biased movable gauge block in said box operating said switch, variable gap elements carried by said box normally interrupting the movement of said block, a work-gauging member extending from said box, one of said gap elements being pivotably mounted for rocking by said work-gauging member to permit the movement of said gauge block through the gap, means carried by said box for adjusting the pivotal point of such element to variably determine the movement of said work-gauging member required to permit the said movement of said gauge block, means carried by said box for moving the other gap element toward and from the pivotal element to vary the initial spacing of the said gap elements, and manually operable means for returning said block to its original pre-set position.

SHUBEL A. FOSTER.